United States Patent
Toyoshima et al.

(10) Patent No.: US 6,718,925 B2
(45) Date of Patent: Apr. 13, 2004

(54) HEAT STORAGE TANK

(75) Inventors: Takashi Toyoshima, Obu (JP); Toshio Morikawa, Toyota (JP); Koichi Ban, Tokai (JP)

(73) Assignee: Denso Corporation, Kariya (JP)

( * ) Notice: Subject to any disclaimer, the term of this patent is extended or adjusted under 35 U.S.C. 154(b) by 27 days.

(21) Appl. No.: 10/229,538

(22) Filed: Aug. 28, 2002

(65) Prior Publication Data

US 2003/0041828 A1 Mar. 6, 2003

(30) Foreign Application Priority Data

Sep. 6, 2001 (JP) ........................................ 2001-270821

(51) Int. Cl.$^7$ .............................................. E02N 17/02
(52) U.S. Cl. .............................. 123/142.5 R; 123/41.14
(58) Field of Search ......................... 123/41.14, 142.5 R

*Primary Examiner*—Noah P. Kamen
(74) *Attorney, Agent, or Firm*—Harness, Dickey & Pierce, PLC

(57) ABSTRACT

In a heat storage tank, an elbow pipe member defining a water introduction passage is formed by connecting an inlet-side cylinder portion and an outlet-side cylinder portion to have a corner portion. A step portion is disposed in the water introduction passage around a position where center lines of both the cylinder portions are crossed with each other. The step portion has a collision surface that is set to cross with a line parallel to the center line of the inlet-side cylinder portion, so that water introduced from the inlet-side cylinder portion collides with the collision surface of the step portion.

14 Claims, 8 Drawing Sheets

FIG. 6B --Prior Art--

HEAT STORAGE TANK

CROSS-REFERENCE TO RELATED APPLICATION

This application is related to and claims priority from Japanese Patent Application No. 2001-270821 filed on Sep. 6, 2001, the contents of which are hereby incorporated by reference.

BACKGROUND OF THE INVENTION

1. Field of the Invention

The present invention relates to a heat storage tank in which a non-compressive fluid such as a hot water is thermally insulated and stored, and is suitably applied to a vehicle heat storage tank in which cooling water (hot water) for cooling a vehicle engine is thermally insulated and stored.

2. Description of Related Art

For example, in a heat storage tank proposed in U.S. patent application Publication No. 2002-0040693 A1, an elbow pipe portion, where a water introduction passage is bent by an approximate right angle, is formed at a lower side portion of a tank body, for supplying water into the tank body. Therefore, a relative large pressure loss (bending loss) is readily caused, and water-flow resistant becomes larger.

SUMMARY OF THE INVENTION

In view of the above problem, it is an object of the present invention to provide a heat storage tank that can effectively restrict a pressure loss of a fluid in an elbow pipe member.

According to the present invention, in a heat storage tank having a tank body for thermally insulating and storing a fluid, an elbow pipe member defining an introduction passage communicating with the tank body includes a first cylinder portion having an introduction port for introducing the fluid, and a second cylinder portion having a discharge port from which the fluid introduced from the introduction port is injected into the tank body. The first cylinder portion and the second cylinder portion are connected to have a corner portion therebetween. Further, the heat storage tank includes a discharge pipe member defining a discharge passage having an introduction port from which the fluid in the tank body is introduced to be discharged outside the tank body through the discharge passage. In the heat storage tank, a step portion is disposed in the elbow pipe member around a position where an axial line of the first cylinder portion and an axial line of the second cylinder portion are substantially crossed with each other. Further, the step portion has a protrusion end surface protruding toward the corner portion, a collision surface extending from the protrusion end surface, to which the fluid flowing from the first cylinder portion collides, and a guide surface extending from the protrusion end surface for guiding the fluid flowing from the first cylinder portion toward the discharge port in the second cylinder portion. Accordingly, the fluid flowing from the introduction port of the first cylinder portion collides with at least the step portion and an inner surface of the second cylinder portion at plural positions, while a flow direction of the fluid is turned in the elbow pipe member. Thus, it can restrict the flow of the fluid from being greatly disturbed, and a pressure loss in the elbow pipe member can be reduced.

Preferably, the step portion is constructed so that a flow rate of the fluid becomes larger at a center portion in a flow distribution of the fluid flowing from the discharge port of the second cylinder portion. Therefore, the fluid can be uniformly introduced into the tank body from the discharge port of the second cylinder portion.

Further, the collision surface of the step portion is provided opposite to the introduction port of the first cylinder portion, and the collision surface of the step portion is provided to be positioned at a side of the introduction port of the first cylinder portion from an outer peripheral surface of the discharge pipe member. Therefore, a face space facing the introduction port of the first cylinder portion can be made larger, among the space around the discharge pipe member. Thus, the fluid is effectively guided by the step portion, and readily flows through the second cylinder portion without being greatly affected by the discharge pipe member. Accordingly, the pressure loss in the elbow pipe member can be effectively reduced.

In addition, the center line of the discharge pipe member is positioned opposite to a side of the introduction port, relative to the center line of the second cylinder portion. Therefore, the face space facing the introduction port of the first cylinder portion can be more readily made larger.

Preferably, the protrusion end surface of the step portion has a height dimension from a bottom surface of the first cylinder portion, and the height dimension of the protrusion end surface is made smaller than an inner diameter of the introduction port of the first cylinder portion such that a part of the step portion is positioned on a projection area of the introduction port of the first cylinder portion. Therefore, it can restrict the passage sectional area of the elbow pipe member at the corner portion from being greatly small due to the step portion. Accordingly, it can restrict the throttle loss from being increased in the elbow pipe member at the corner portion while the pressure loss in the elbow pipe member can be sufficiently reduced.

BRIEF DESCRIPTION OF THE DRAWINGS

Additional objects and advantages of the present invention will be more readily apparent from the following detailed description of preferred embodiments when taken together with the accompanying drawings, in which:

FIG. 6B is a sectional view showing a water flow in an elbow pipe portion without having a step portion;

DETAILED DESCRIPTION OF THE PRESENTLY PREFERRED EMBODIMENTS

The present invention will be described hereinafter with reference to the appended drawings.

First Embodiment

Figure 1:
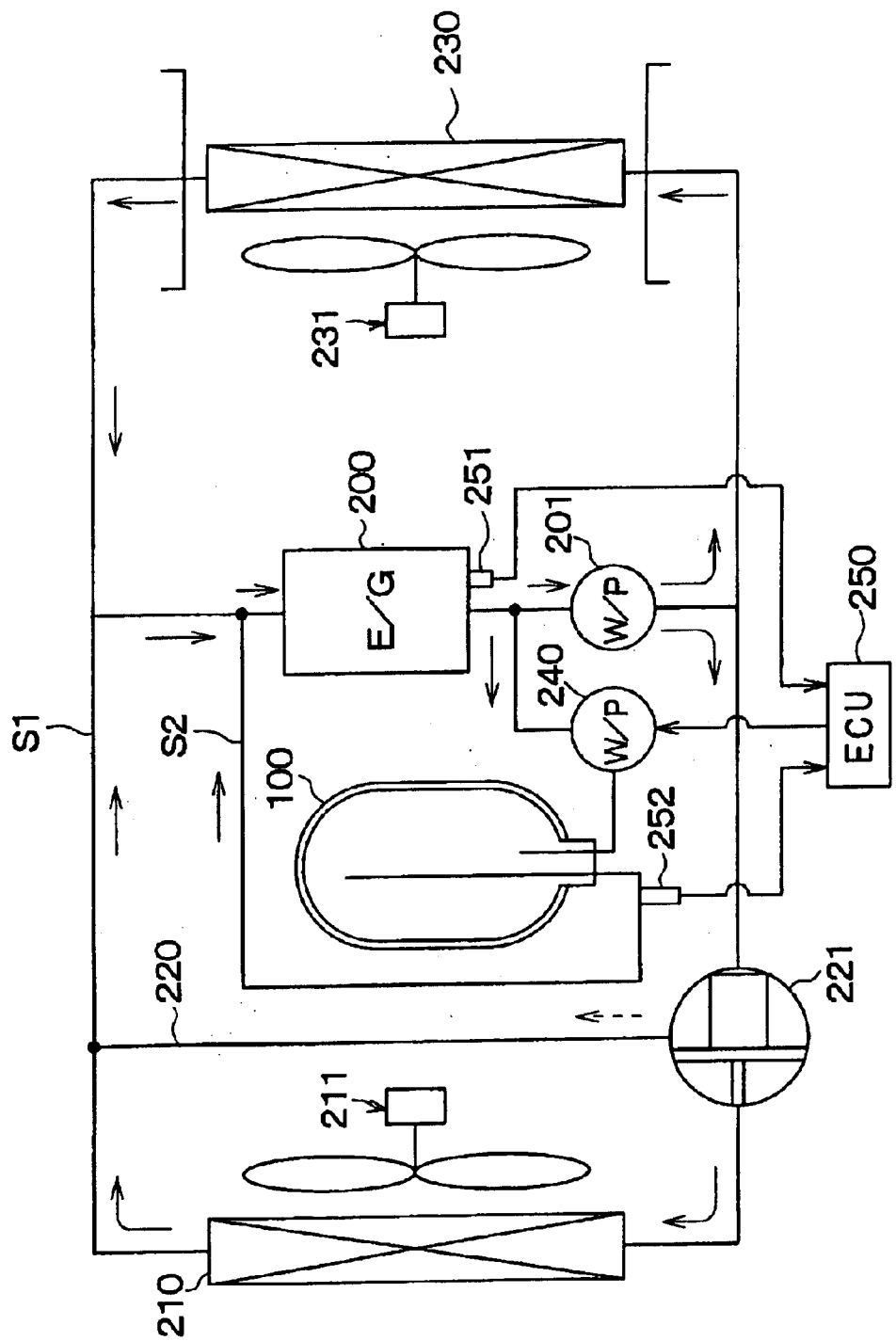
FIG. 1 is a schematic diagram showing a vehicle water circuit according to embodiments of the present invention.

In the first embodiment, as shown in FIG. 1, a heat storage tank 100 according to the present invention is typically used for a vehicle water circuit. A radiator 210 provided in the water circuit is a heat exchanger which cools water by performing heat-exchange between the water from a water-cooled engine (E/G) 200 and air. The water from the radiator 210 flows through the engine 200 and cools the engine 200.

A bypass circuit 220 is a water circuit through which water circulates while bypassing the radiator 210. A thermostat 221 adjusts an amount of water flowing into the bypass circuit 220 and an amount of water flowing into the radiator 210 so as to set the temperature of the engine 200 at a predetermined temperature. A blower 211 is disposed to blow cooling air (i.e., outside air) to the radiator 210 to cool the radiator 210. A heater core 230 is disposed to heat air blown into a passenger compartment using the engine-cooling water (hot water) as a heating source. A blower 231 is an interior blower for blowing air into the heater core 230.

A first pump 201 is operated using motive power from the engine 200, to circulate water in a first water circuit S1 including the engine 200, the radiator 210, the bypass circuit 220 and the heater core 230. A second pump 240 is operated by an electrical power, to circulate water in a second water circuit S2 including the heat storage tank 100 and the engine 200. In the second water circuit S2, water flows into the heat storage tank 100 from the engine 200, and flows into the engine 200 from the heat storage tank 100. Since water is circulated by the second pump 240 in the second water circuit S2, the flow of water in the second water circuit S2 can be independently controlled without being affected by the water flow in the first water circuit S1.

A first temperature sensor 251 is provided in the engine 200, to detect the temperature of the engine 200 or the temperature of water circulating in the engine 200. A second temperature sensor 252 is provided in the second water circuit S2 at a water outlet side of the heat storage tank 100 to detect the temperature of water (hot water) flowing out from the heat storage tank 100. Detection signals from the temperature sensors 251, 252 are input to an electronic control unit (ECU) 250. The ECU 250 controls the second pump 240 based on the detection signals from the temperature sensors 251, 252 and the like.

Figure 2:
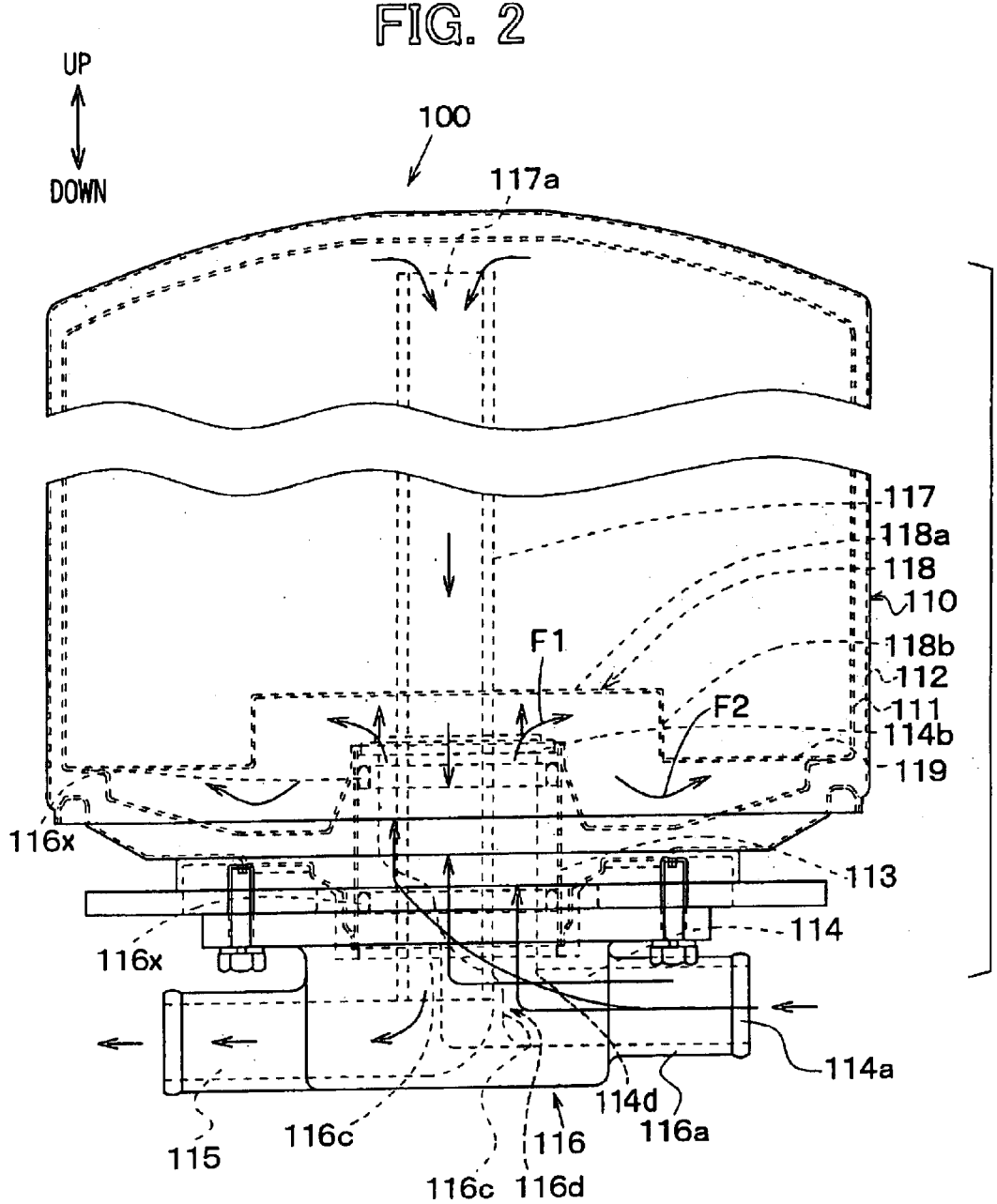
FIG. 2 is a schematic front view showing a heat storage tank according to a first embodiment of the present invention.
Figure 3:
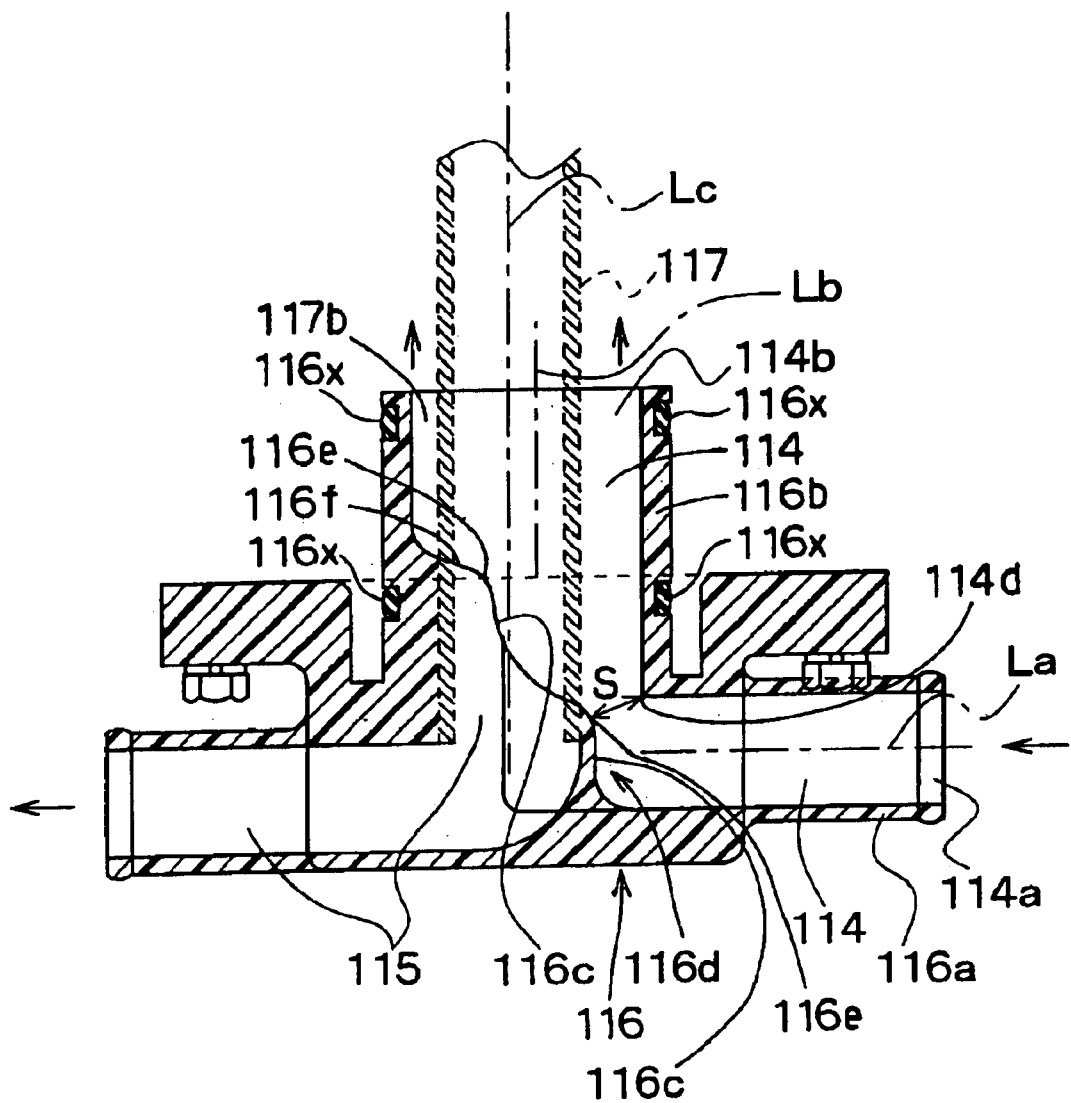
FIG. 3 is a sectional view showing a passage forming member used for the heat storage tank according to the first embodiment.

Next, the heat storage tank 100 will be described in detail with reference to FIG. 2. Water is thermally insulated and stored in a tank body 110. The tank body 110 has a double-wall thermal-insulating structure including an inside tank portion 111 and an outside tank portion 112. Both the tank portions 111, 112 are made of a material having a sufficient corrosion-resisting performance (e.g., stainless steel). Here, a vacuum condition is almost maintained between both the tank portions 111, 112 so as to form a heat-insulating layer therebetween. As shown in FIGS. 2 and 3, a pipe member 113 for forming a discharge water passage is provided, to penetrate through both tank portions 111, 112 to be communicated with an interior of the tank body 110 and an exterior thereof. Further, the pipe member 113 is welded to both the tank portions 111, 112 at a lower side position of the tank body 110.

A passage forming member 116 made of a material having a sufficient heat-insulating performance (e.g., nylon group resin) is water-tightly attached into the pipe member 113 through seal members 116x. A water introduction passage 114 and a water discharge passage 115 are provided in the passage forming member 116, and a valve housing of a valve (not shown) for opening and closing both passages 114, 115 is also provided within the passage forming member 116. Water is introduced into the tank body 110 through the water introduction passage 114, and water stored in the tank body 110 is discharged to an outside of the tank body 110 through the water discharge passage 115. As shown in FIG. 3, the water introduction passage 114 is formed by an elbow pipe member in the pipe forming member 116.

The introduction passage 114 and the discharge passage 115 are partitioned from each other by a pipe 117 in the pipe forming member 116. As shown in FIG. 3, the passage forming member 116 for forming the water introduction passage 114 has an inlet-side cylinder portion 116a extending approximately horizontally from an introduction port 114a toward a downstream water side, and an outlet-side cylinder portion 116b extending from a discharge port 114b toward an upstream water side approximately perpendicular to the inlet-side cylinder portion 116a. The inlet-side cylinder portion 116a and the outlet-side cylinder portion 116b are connected to construct the water introduction passage 114, such that a center line La of the inlet-side cylinder portion 116a is approximately perpendicular to a center line Lb of the outlet-side cylinder portion 116b.

A step portion 116d (e.g., curved step portion) having plural collision surfaces 116c (e.g., two, in the first embodiment) crossing with a line parallel to the center line La is provided in the water introduction passage 114 at a collision position where the water flowing from the introduction port 114a collides. The collision position corresponds to around the position where the center lines La and Lb of both the cylinder portions 116a, 116b are crosses from each other. The step portion 116d is formed to have at least one step (e.g., two steps in this embodiment) that extend toward the discharge port 114b as the passage position extends from the introduction port 114a toward the back side (i.e., from the right side to the left side in FIG. 3).

For example, the step portion 116d is formed to have two steps in the first embodiment. Therefore, the step portion 116d has plural protrusion end surfaces 116e (e.g., two, in the first embodiment) protruding toward the inlet-side cylinder portion 116a. Further, the bottom-side protruding end surface 116e protrudes toward a corner portion 114d between the inlet-side cylinder portion 116a and the outlet-side cylinder portion 116b, and a guide surface 116f is provided for guiding the water from the top-side protrusion end surface 116e toward the discharge port 114b of the outlet-side cylinder portion 116b.

The pipe 117 for discharging water at an upper side in the tank body 110 to the outside of the tank body 110 is inserted into the step portion 116d. A center line Lc of the pipe 117 is approximately parallel to the center line Lb of the outlet-side cylinder portion 116b, and is offset from the center line Lb of the outlet-side cylinder portion 116b to a side opposite to the side of the introduction port 114a.

Accordingly, in the heat storage tank 100, water flows into the water introduction passage 114 from the introduction port 114a, and flows upwardly through the water introduction passage 114 between the pipe 117 and the outlet-side cylinder portion 116b. Thereafter, the water is discharged into the tank body 110 from the water discharge port 114b upwardly. On the other hand, water in the tank body 110 flows into the pipe 117 from an introduction port 117a positioned at an upper side in the tank body 110, flows through the pipe 117 downwardly, and is discharged to the outside through an outlet passage 115 formed by the passage forming member 116.

As described above, because the water introduction passage 114 and the water discharge passage 115 are partitioned by the pipe 117, the pipe 117 is also made of a material such as a resin, having a sufficient heat-insulating performance.

Figure 5A:
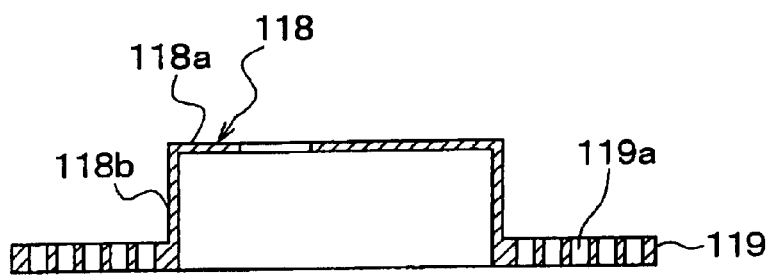
FIG. 5A is a sectional view showing a collision member used for the heat storage tank according to the first embodiment.
Figure 5B:
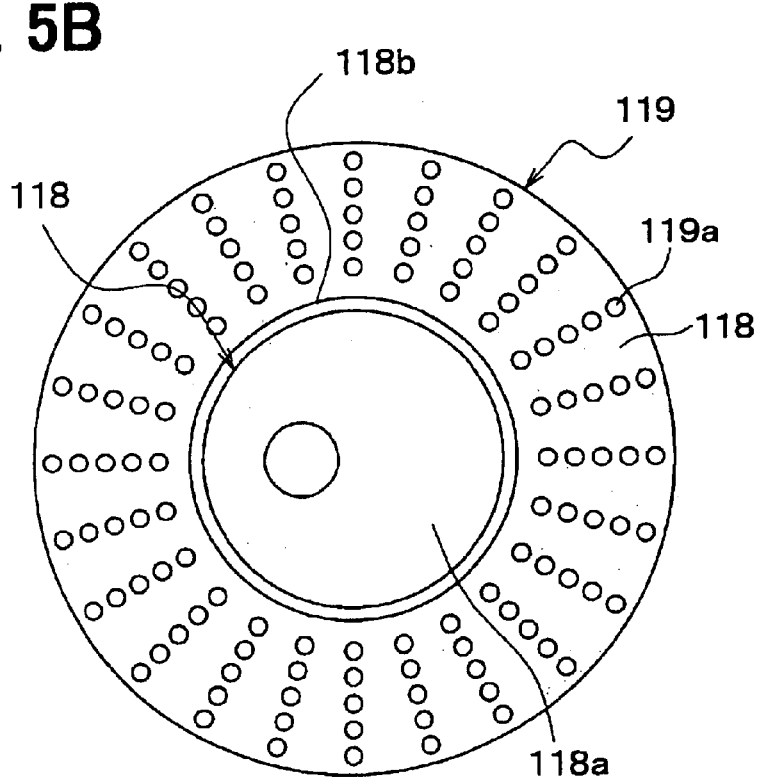
FIG. 5B is a top view of FIG. 5A.

As shown in FIG. 2 and FIGS. 5A and 5B, a collision member 118 is attached to the pipe 117 around the water discharge port 114b, so that water flowing out from the discharge port 114b collides with the collision member 118. The collision member 118 includes a disc-shaped shield portion 118a having an insertion hole into which the pipe 117 is inserted, and a cylindrical guide portion 118b formed into an approximate cylindrical shape. The shield portion 118a of the collision member 118 is disposed to be opposite to the water discharge port 114b, and is separated from the water discharge port 114b by a predetermined dimension. That is, the shield portion 118a extends in a direction approximately perpendicular to an opening direction of the water discharge port 114b. The guide cover 118b extends from the peripheral end of the shield portion 118a to a side of the water discharge port 114b so as to cover the water discharge port 114b around all its outer peripheral portion at a position separated therefrom by a predetermined dimension. The pipe 117 is tightly inserted into the insertion hole of the collision member 118.

As shown in FIGS. 5A and 5B, a mixture protection plate 119 having plural through holes 119a through which water passes is provided at an end portion of the collision member 118. That is, in the first embodiment, the mixture protection plate 119 is provided at an end portion of the guide cover 118b opposite to the shield portion 118a, between the collision member 117 and an inner wall of the tank body 110. The mixture protection plate 119 is provided so as to partition the tank body 110 into a side of the water discharge port 114a and a side of the introduction port 117a of the pipe 117. In the first embodiment, the collision member 118 and the mixture protection plate 119 are integrally formed by deformation processing such as pressing and drawing.

Next, operations of the water circuit according to the first embodiment will be described.

(1) Heat Storage Mode

The heat storage mode is performed when the engine 200 is operated and a temperature T1 of water discharged from the engine 200, detected by the first temperature sensor 251, is higher than a predetermined temperature T0. Specifically, in the heat storage mode, high-temperature water discharged from the engine 200 is supplied to the heat storage tank 100 by driving the second pump 240, and is stored in the tank body 110 of the heat storage tank 100. The predetermined temperature T0 is a temperature at which the engine 200 can be determined to end warming-up operation, and is approximately 80° C. in the first embodiment.

(2) Warming-Up Mode

The warming-up mode (engine-heating mode) is performed when the operation of the engine 200 is started. Specifically, in the warming-up mode, the second pump 240 is operated at the same time when the engine 200 is started. Accordingly, high-temperature water stored in the heat storage tank 100 is supplied to the engine 200, so that the warming-up operation of the engine 200 can be facilitated. Further, when the warming-up operation is performed in winter, since high-temperature hot water can be supplied to the heater core 230 directly after starting the engine 200, the passenger compartment can be rapidly heated.

(3) Cold-Water Holding Mode

Next, the cold-water holding mode is performed when the engine 200 is driven and a temperature T2 of water discharged from the heat storage tank 100, detected by the second temperature sensor 252 is lower than a predetermined temperature T0. Specifically, in the cold-water holding mode, the second pump 240 is stopped. When it is determined that all the high-temperature water thermally insulated and stored in the heat storage tank 100 is discharged in the warming-up mode, the operation mode is switched from the warming-up mode to the cold-water holding mode. Therefore, low-temperature water flowing from the engine 200 is stored in the heat storage tank 100 without being discharged from the heat storage tank 100. That is, in the cold-water holding mode, it can prevent low-temperature water from flowing into the engine 200 from the heat storage tank 100, thereby facilitating the warming-up operation of the engine 200. When the capacity of the tank body 110 is set to be equal to or larger than an amount of water within the engine 200, the warming-up operation of the engine 200 can be effectively enhanced. Here, when the temperature T1 detected by the second temperature sensor 251 becomes equal to or higher than the predetermined temperature T0, the cold-water holding mode is switched to the heat storage mode.

(4) Hot-Water Holding Mode

The hot-water holding mode is performed when the engine 200 is stopped. Specifically, in the hot-water holding mode, the second pump 240 is stopped, so that the high-temperature water stored in the heat storage mode is thermally insulated and stored in the heat storage tank 100.

Next, operational effects of the heat storage tank 100 according to the first embodiment will be described.

Figure 6A:
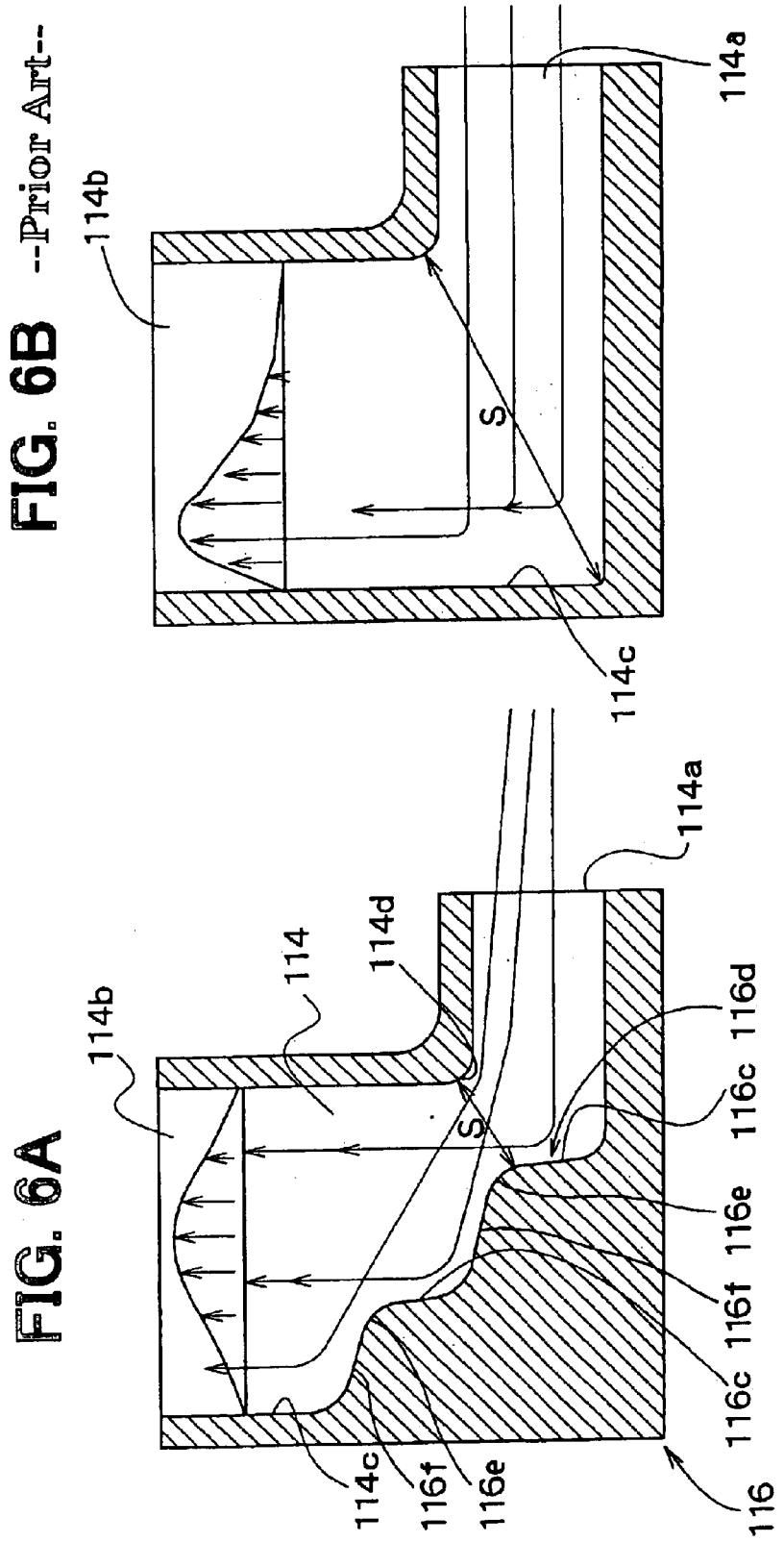
FIG. 6A is a sectional view showing a water flow in an elbow pipe portion having a step portion, used for the heat storage tank of the first embodiment.

FIG. 6A shows a water flow in the elbow pipe member defining the water introduction passage 114 when the step portion 116d is provided in the water introduction passage 114 according to the first embodiment. FIG. 6B shows a water flow without having a step portion in the elbow pipe member, in a comparison example. As shown in FIG. 6B, when the step portion 116d is not provided, almost the water flowing from the water introduction port 114a collides with a part of a wall surface 114c, facing the water introduction port 114a, so that the flow direction of the water is turned (changed). Therefore, the water flow is greatly disturbed around the part of the wall surface 114c, facing the water introduction port 114a, and a flow rate of the water becomes larger at a position adjacent to the wall surface 114c. Accordingly, flow distribution of the water becomes ununiform in the water discharge passage 114.

According to the first embodiment of the present invention, the step portion 116d having the collision surfaces 116c crossing with a line parallel to the center line La of the inlet-side cylinder portion 116 is provided in the water introduction passage 114 around the collision position colliding with the water flowing from the introduction port 114a. Here, the collision position corresponds to the position at which the center lines La, Lb of both the cylinder portions 116a, 116b are crossed with each other. Therefore, the water flowing from the introduction port 114a collides at plural positions such as the collision surfaces 116c and the inner wall surface 114c of the outlet-side cylinder portion 116b. Accordingly, it is compared with the case shown in FIG. 6B, a large flow disturbance of the water can be prevented, and the pressure loss (bending loss) of the water introduction passage 114 can be reduced.

Further, the step portion 116d is formed stepwise to extend toward the discharge port 114b as the position of the step portion 116d is toward the back side (i.e., left side in FIG. 6A) from the side of the introduction port 104a. Accordingly, it can prevent the flow rate of the water from being excessively large on the side of the wall surface 114c in the discharge port 114b. That is, in the first embodiment, the flow rate of the water is larger at an approximate center portion in a flow distribution of the water flowing from the discharge port 114b. Therefore, the water flows from the discharge port 114b more uniformly as compared with the case shown in FIG. 6B. In FIGS. 6A, 6B, S indicates a sectional area of the water passage at the corner portion 114d.

Figure 4:
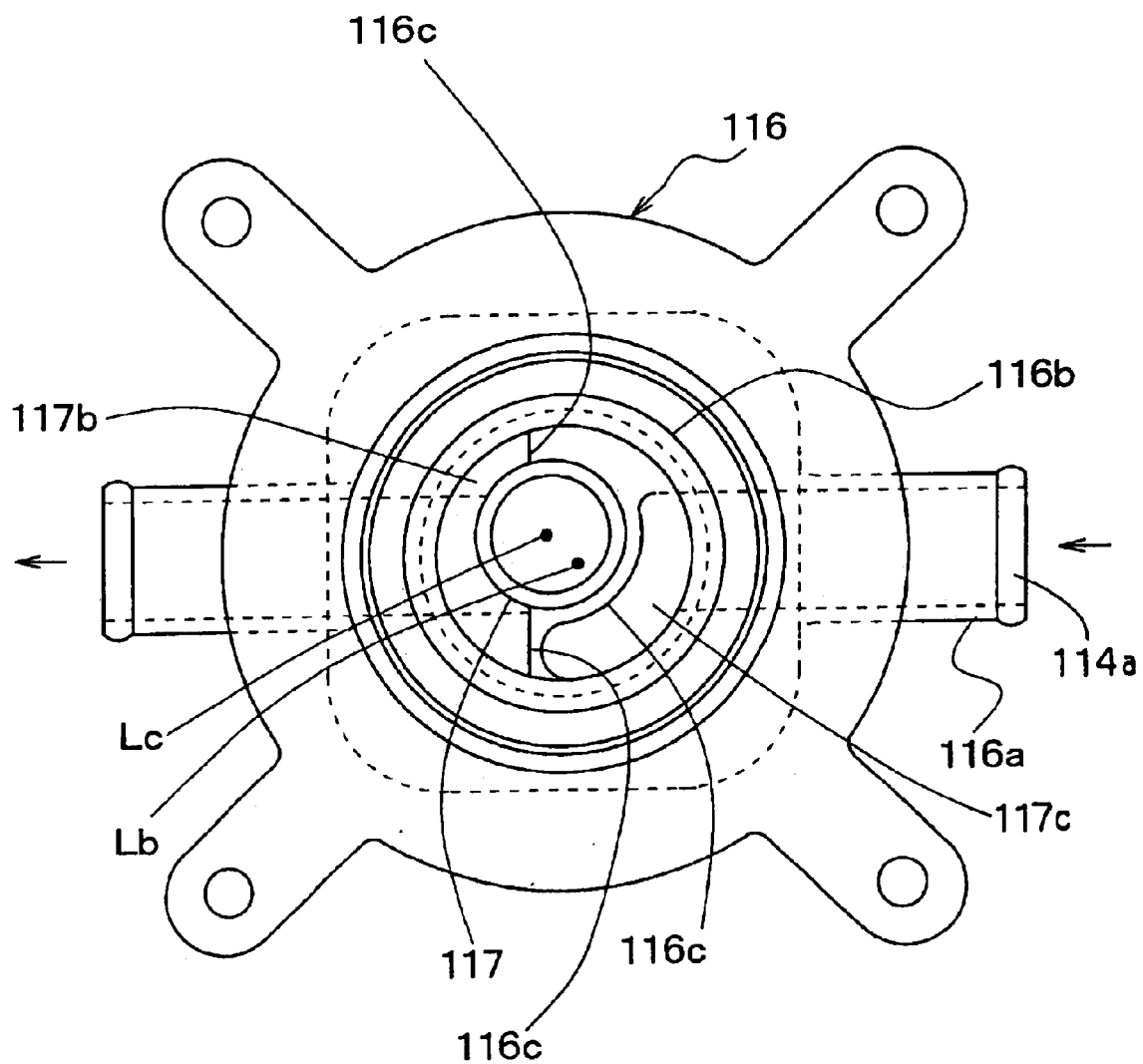
FIG. 4 is a top view showing the passage forming member used for the heat storage tank according to the first embodiment.

When the angle portions of the protrusion end surfaces 116e of the step portion 116d are formed into sharp shapes similar to actual step like, the water flow is readily disturbed. In this point, it is preferable to form each angle portion of the protrusion end surface 116e to a curve surface having a large curvature radius. In the first embodiment, the pipe 117 is disposed around the collision surfaces 116c of the step portion 116d, apart of water flowing from the inlet-side cylinder portion 116a toward the collision surface 116c of the step portion 116 collides with a part of the outer peripheral surface of the pipe 117. Accordingly, as shown in FIG. 4, water is difficult to flow into a space 117b opposite to the inlet-side cylinder portion 116a, among the space around the pipe 17. Thus, a part space in the outlet-side cylinder portion 116b, corresponding to the space 117b, cannot be effectively used as a water passage.

In the first embodiment, as shown in FIGS. 2 and 3, the step portion 116d is provided to have at least a portion protruding toward the introduction port 114a (i.e., inlet-side cylinder portion 116a) more than the pipe 117. Therefore, water readily flows in a space 117c (see FIG. 4) positioned at the side of inlet-side cylinder portion 116a, among the space around the pipe 117. Because the flow direction of water is turned in the space 117c where the water readily flows, the pressure loss in the water introduction passage 114, can be reduced.

Further, as shown in FIG. 4, the pipe 117 is disposed such that the center line Lc of the pipe 117 is positioned at the side opposite to the introduction port 114a, relative to the center line Lb of the outlet-side cylinder portion 116b. Therefore, among the space around the pipe 117, the space 117c positioned at the side of the inlet-side cylinder portion 116a can be made larger, and the pressure loss of the water introduction passage 114 can be further reduced.

Further, in first embodiment, the collision member 118, constructed by the shield portion 118a and the guide cover 118b, has an approximate cup shape, and is provided around the discharge port 114b. Therefore, high-speed water injected from the discharge port 114b toward an upper side of the tank body 110 collides with the shield portion 118a as shown by the arrow F1 in FIG. 1. Thereafter, the flow direction of the injection water turns by an approximately right angle (horizontally in FIG. 4), and is guided by the guide cover 118b to be turned to a lower side. Then, after the flow speed of the injection water is sufficiently reduced, water reaches to a lower side of the mixture protection plate 119, as shown by the arrow F2 in FIG. 2. Since the injection stream from the discharge port 114b can be sufficiently turned by the collision member 118, it can prevent water stored in the tank body 110 from being agitated even when the water injected from the discharge port 114b has a high flow speed, thereby improving heat-storage performance of water in the heat storage tank 100.

Further, the guide cover 118b is disposed to cover the discharge port 114b along an entire outer periphery of the discharge port 114b. Therefore, it can accurately prevent the water in the tank portion 110 from being mixed, along the entire outer periphery of the discharge port 114b. Further, the discharge port 114b is covered by the collision member 118 fully when being viewed from the direction perpendicular to the injection water direction. Therefore, a flow-turning interval, in which the injection water from the discharge port 114a turns by an inner surface of the collision member 118, is made longer. Since the injection flow direction of water can be surely turned, the flow speed of the injection water can be sufficiently reduced. As a result, water stored in the tank body 110 can be surely prevented from being agitated even when the injection water has a high flow speed.

In the above-described first embodiment, the step portion 116 is formed to have two steps having lower and upper protrusion end surfaces 116e. However, the step portion 116 can be formed into plural steps having plural protrusion surfaces 116e more than two. Alternatively, the step portion 116 can be formed into one step only having one protrusion end surface 116e protruding toward the corner portion 114d. Further, the positions of the protrusion end surfaces 116e can be shifted so that it can prevent the sectional area S of the water passage at the corner portion 114d from being greatly small.

Second Embodiment

Figure 7:
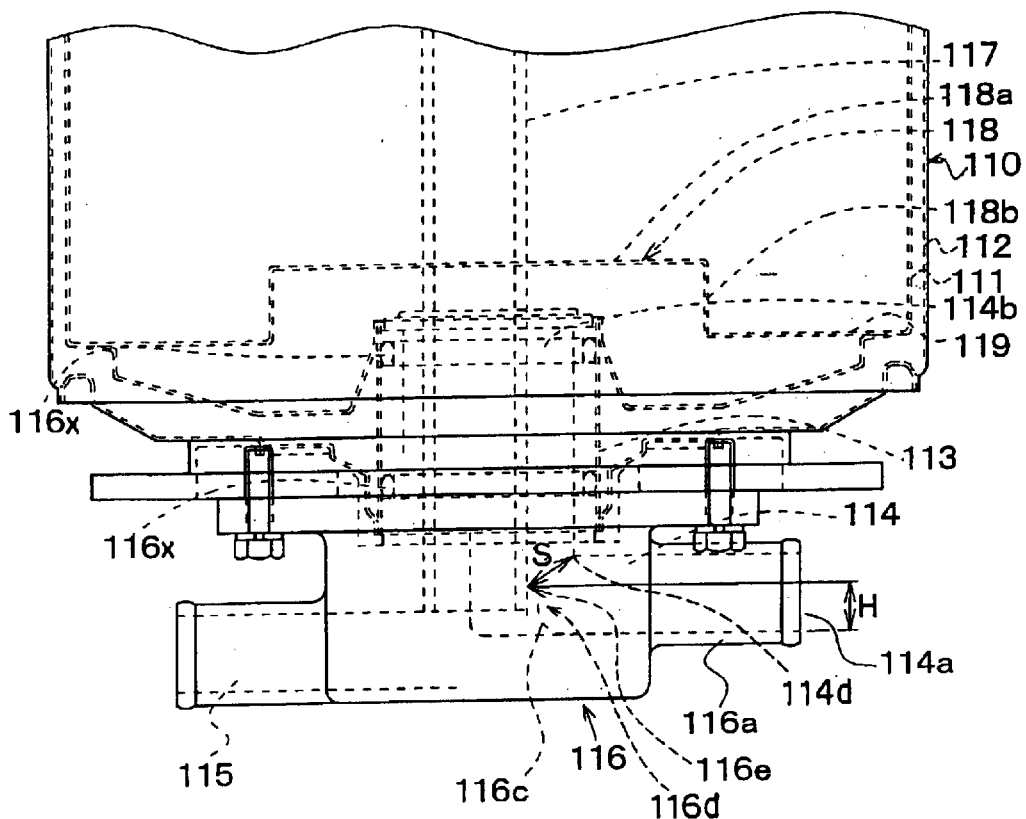
FIG. 7 is a schematic front view of a heat storage tank according to a second preferred embodiment of the present invention.
Figure 8:
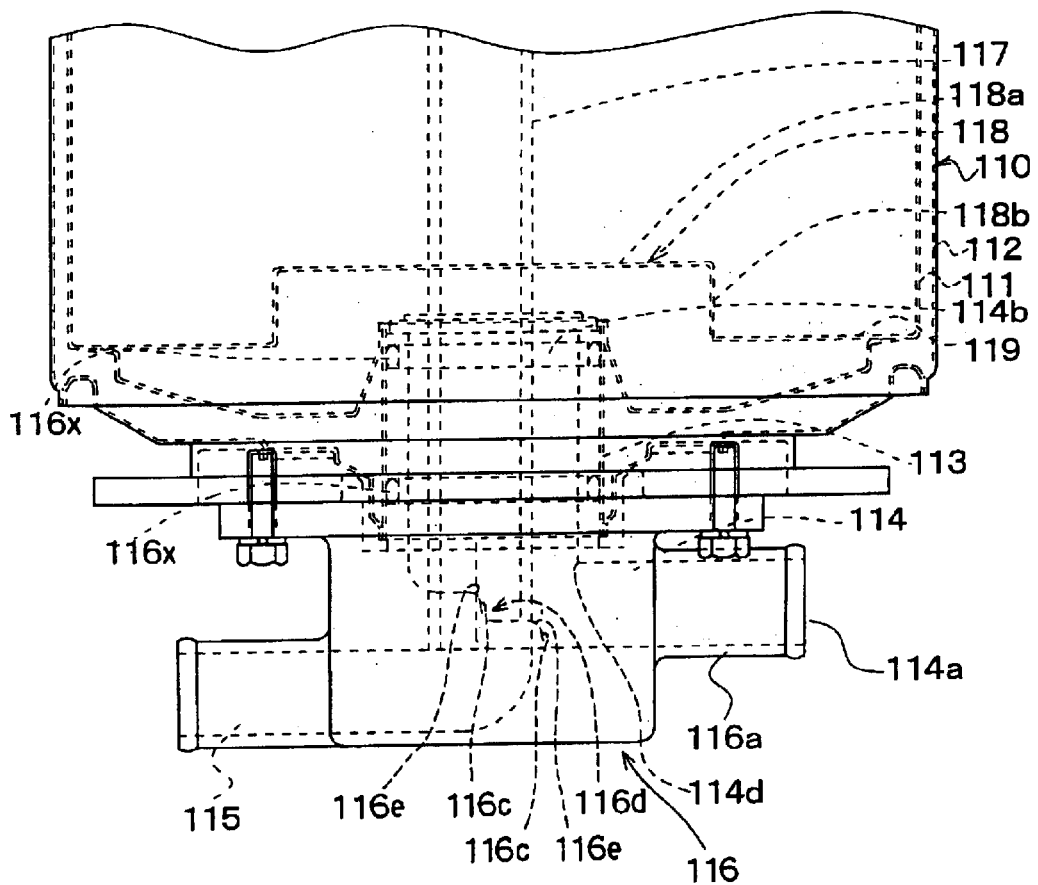
FIG. 8 is a schematic front view of a heat storage tank according to a third preferred embodiment of the present invention.

In the second embodiment, as shown in FIG. 7, the height dimension H of the first step (bottom side step) is made smaller, so that the sectional area S of the water introduction passage 114 at the corner portion 114d is increased. That is, the height dimension of the collision surface 116c at the first step is made smaller, so that the lower-side protrusion end surface 116e is positioned in a projection area of the introduction port 114a. Accordingly, at least the lower-side protrusion end surface 116e and the collision surface 116c of the first step can be positioned in the projection area of the introduction port 114a. In this case, the sectional area S at the corner portion 114d can be made larger so that the throttle loss at the corner portion 114d can be made smaller. Further, the height dimension H of the first step (bottom side step) of the step portion 116, from the inner bottom surface of the inlet-side cylinder portion 116a to the lower-side protrusion end surface 116e, is made smaller than the inner diameter of the introduction port 114a for increasing the sectional area S. Accordingly, in the second embodiment, it can effectively prevent the sectional area S of the water introduction passage 114 at the corner portion 114d from being greatly reduced. Thus, in the second embodiment, at the corner portion 114d, it can restrict the throttle loss from being increased, while the bending loss can be reduced by forming the step portion 116d. As a result, pressure loss in the whole water introduction passage 114 can be sufficiently reduced.

Third Embodiment

In the above-described second embodiment of the present invention, the protrusion end surface 116e at the first step (bottom-side step) of the step portion 116d is positioned on the projection area of the introduction port 114a. In the third embodiment, the height dimensions of all the protrusion end surfaces 116e from the inner bottom surface of the inlet-side cylinder portion 116a are set smaller than the inner diameter of the introduction port 114a, so that all the protrusion end surfaces 116e of the step portion 116 with the plural steps are positioned on the projection area of the introduction port 114a. That is, all the protrusion end surfaces 116e of the step portion 116 can be shown when being viewed from the introduction port 114a. Accordingly, it can further prevent the throttle loss from being increased, and the pressure loss in the entire water introduction passage 114 having the corner portion 114d from being further reduced.

Although the present invention has been fully described in connection with the preferred embodiments thereof with reference to the accompanying drawings, it is to be noted that various changes and modifications will become apparent to those skilled in the art.

For example, the heat storage tank according to the present invention can be used for another system without being limited to a vehicle. A heat-insulating material may be disposed between the inside and outside tank portions 111, 112 without being limited to an approximate vacuum therebetween. Further, the tank body 110 may be constructed by a single-wall structure without being limited to the double-wall structure.

Such changes and modifications are to be understood as being within the scope of the present invention as defined by the appended claims

What is claimed is:

1. A heat storage tank, comprising:

a tank body for thermally insulating and storing a fluid;

an elbow pipe member defining an introduction passage communicating with the tank body, the elbow pipe member including a first cylinder portion having an introduction port for introducing the fluid, and a second cylinder portion having a discharge port from which the fluid introduced from the introduction port is injected into the tank body, the first cylinder portion and the second cylinder portion being connected to have a corner portion therebetween;

a discharge pipe member defining a discharge passage having an introduction port from which the fluid in the tank body is introduced to be discharged outside the tank body through the discharge passage; and a step portion disposed in the elbow pipe member around a position where an axial line of the first cylinder portion and an axial line of the second cylinder portion are substantially crossed with each other, wherein:

the step portion has a protrusion end surface protruding toward the corner portion, a collision surface extending from the protrusion end surface, to which the fluid flowing from the first cylinder portion collides, and a guide surface extending from the protrusion end surface for guiding the fluid flowing from the first cylinder portion toward the discharge port in the second cylinder portion.

2. The heat storage tank according to claim 1, wherein:

the discharge pipe member is disposed in the second cylinder portion to penetrate through the tank body;

the axial line of the second cylinder portion is set to be approximately parallel to an axial line of the discharge pipe member; and a flow direction of the fluid flowing through the discharge pipe member is made opposite to a flow direction of the fluid passing through the second cylinder portion.

3. The heat storage tank according to claim 1, wherein the step portion is constructed so that a flow rate of the fluid becomes larger at an approximate center portion in a flow distribution of the fluid flowing from the discharge port of the second cylinder portion.

4. The heat storage tank according to claim 1, wherein:

the collision surface of the step portion is provided opposite to the introduction port; and the collision surface of the step portion is provided to be positioned at a side of the introduction port of the first cylinder portion from an outer peripheral surface of the discharge pipe member.

5. The heat storage tank according to claim 2, wherein:

the center line of the discharge pipe member is positioned opposite to a side of the introduction port of the first cylinder portion, relative to the center line of the second cylinder portion.

6. The heat storage tank according to claim 1, wherein:

the protrusion end surface of the step portion has a height dimension from a bottom surface of the first cylinder portion; and the height dimension of the protrusion end surface is made smaller than an inner diameter of the introduction port of the first cylinder portion such that a part of the step portion is positioned on a projection area of the introduction port of the first cylinder portion.

7. The heat storage tank according to claim 1, wherein the step portion is disposed to be separated from the corner portion by a distance larger than a predetermined distance.

8. The heat storage tank according to claim 1, wherein the step portion has plural step parts formed stepwise, and the step parts having plural collision surfaces to which the fluid introduced from the introduction port of the first cylinder portion collides, and plural protrusion end surfaces protruding toward the first cylinder portion.

9. The heat storage tank according to claim 8, wherein:

each height dimension of the protrusion end surfaces of the step parts from a bottom surface of the first cylinder portion is set smaller than an inner diameter of the introduction port of the first cylinder portion; and at least a part of each the protrusion end surface of the step parts are positioned on a projection area of the introduction port of the first cylinder portion.

10. The heat storage tank according to claim 8, wherein:

each height dimension of the protrusion end surfaces of the step parts from a bottom surface of the first cylinder portion is set smaller than an inner diameter of the introduction port of the first cylinder portion; and at least one of the protrusion end surfaces of the step parts, adjacent to the bottom surface of the first cylinder portion is positioned on a projection area of the introduction port of the first cylinder portion.

11. The heat storage tank according to claim 1, wherein the second cylinder portion is disposed to penetrate through the tank body.

12. The heat storage tank according to claim 1, wherein:

the first cylinder portion is disposed approximately horizontally; and the second cylinder portion is disposed approximately perpendicular to the first cylinder portion.

13. The heat storage tank according to claim 1, wherein the step portion is disposed in the second cylinder portion to be separated from the corner portion such that at least a part of the collision surface faces to the introduction port of the first cylinder portion.

14. The heat storage tank according to claim 1, wherein the protrusion end surface is curved by a curvature radius larger than a predetermined radius.

* * * * *